United States Patent

Takeichi et al.

[11] Patent Number: 5,844,653
[45] Date of Patent: Dec. 1, 1998

[54] LIQUID CRYSTAL MIXTURE

[75] Inventors: Ayako Takeichi, Tokorozawa; Thoshiaki Nonaka, Iruma; Kazuya Nagao, Kawagoe; Hidemasa Yamaguchi, Sayama, all of Japan

[73] Assignee: Hoechst Aktiengesellschaft, Frankfurt, Germany

[21] Appl. No.: 556,566

[22] Filed: Nov. 13, 1995

[30] Foreign Application Priority Data

Nov. 15, 1994 [JP] Japan .................................... 6-280326

[51] Int. Cl.⁶ ........................................................ G02F 1/13
[52] U.S. Cl. ........................ 349/171; 349/172; 349/168; 349/184
[58] Field of Search ................................... 349/171, 184, 349/172, 168

[56] References Cited

U.S. PATENT DOCUMENTS

| | | | |
|---|---|---|---|
| 4,900,132 | 2/1990 | Bos | 349/172 |
| 5,305,131 | 4/1994 | Terada et al. | 349/172 |
| 5,460,749 | 10/1995 | Terada et al. | 349/184 |
| 5,657,141 | 8/1997 | Terada et al. | 349/184 |

OTHER PUBLICATIONS

Masahiro et al, "Liquid Crystal Composition Liquid Crystal Element And Display Device", Dec. 27, 1993, Japan Patent Abstract (40–5345891).
Japanese Journal of Applied Physics, vol. 30, No. 7A, Jul. 1991, pp. L–1189–L–1191.

*Primary Examiner*—William L. Sikes
*Assistant Examiner*—Toan Ton
*Attorney, Agent, or Firm*—Frommer Lawrence & Haug LLP

[57] ABSTRACT

Disclosed and claimed is a liquid crystal mixture, a liquid crystal device and a display device using the liquid crystal mixture. The liquid crystal display device according to the present invention has improved contrast due to the specific temperature of the liquid crystal mixture. More specifically, the liquid crystal mixture has a temperature range generating a chiral smectic C phase and a temperature range generating a smectic A phase, and having a difference between the cone angle at $(T_{C/A}-10)°$ C. and the cone angle at $(T_{C/A}-40)°$ C. in the temperature range generating the chiral smectic C phase of from zero (0) degree to ten (10) degrees.

5 Claims, 3 Drawing Sheets

Fig. 1
Illustration showing a tilt angle $\theta_L$ of a layer and sectional structure of the layer
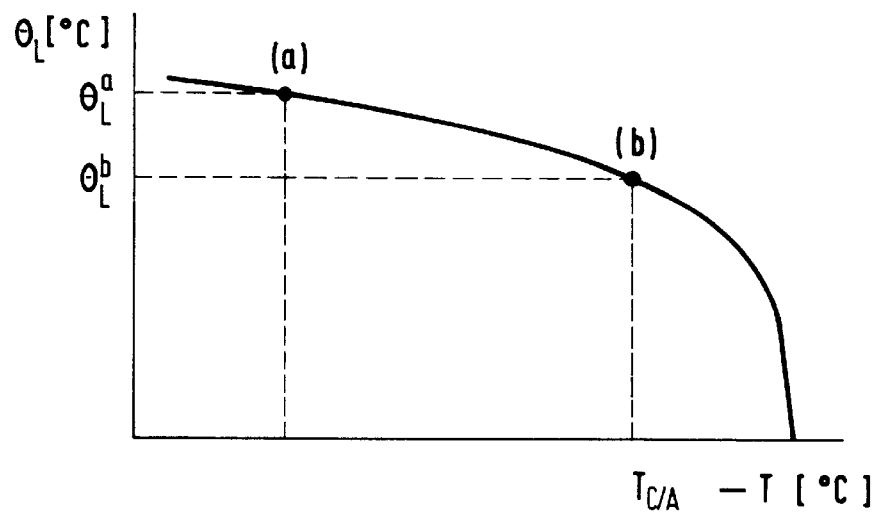
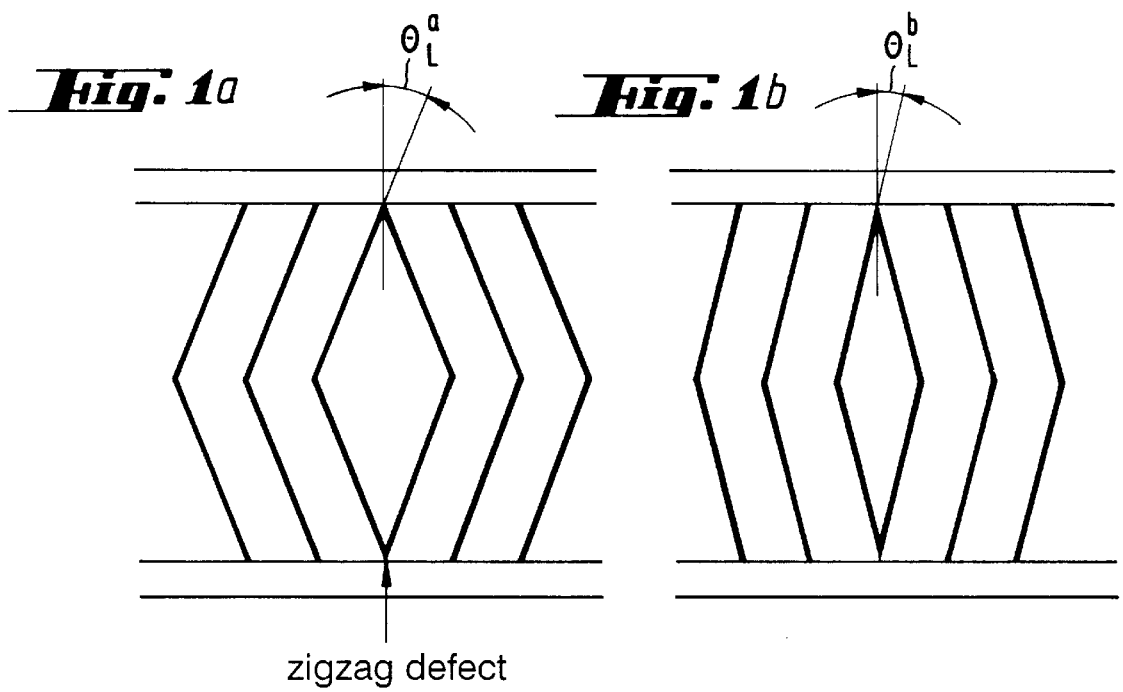
zigzag defect

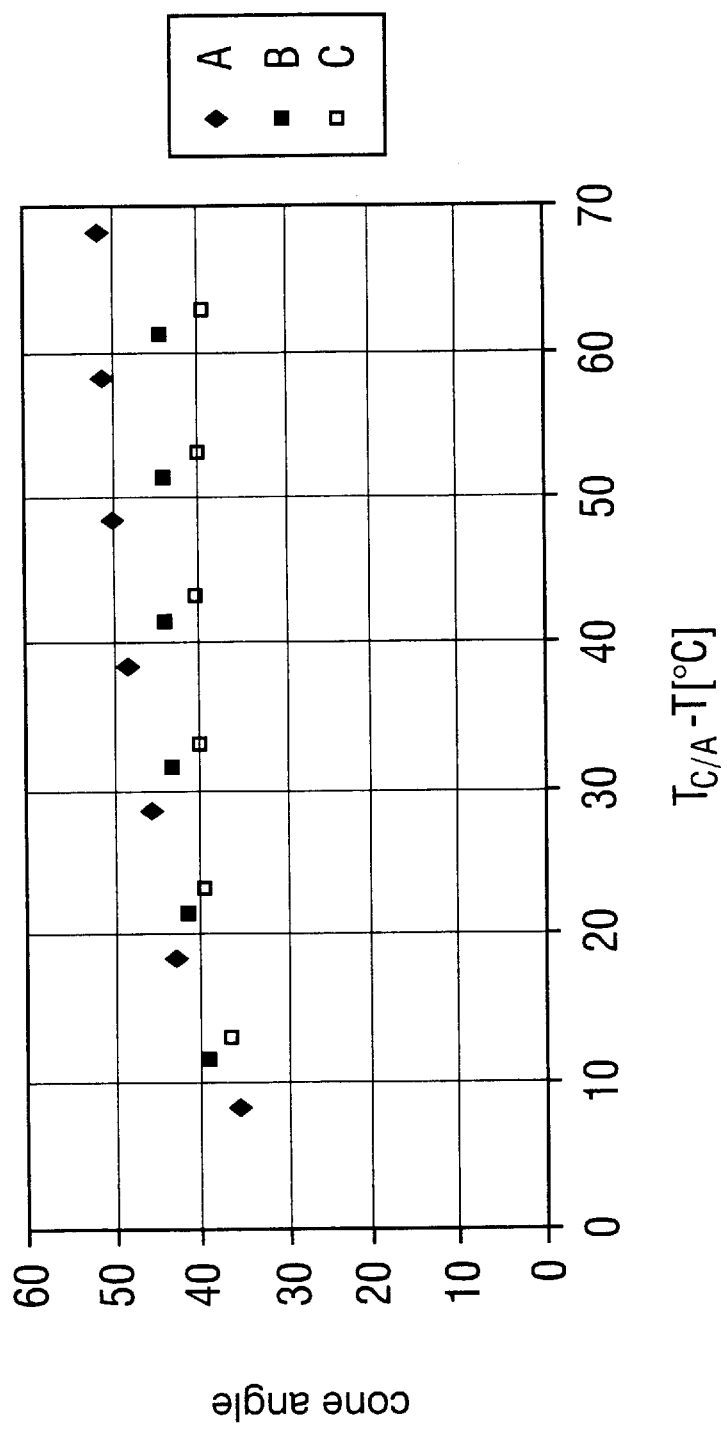

white writing pulse black writing pulse

LIQUID CRYSTAL MIXTURE

DETAILED DESCRIPTION OF THE INVENTION

1. [Field of Utility in Industry]

The present invention relates to a liquid crystal mixture and to a liquid crystal device as well as a display device using the same. More specifically, the present invention provides a liquid crystal display device having an improved contrast by using a liquid crystal mixture having specific temperature characteristics of the cone angle.

2. [Prior Art]

In particular in the last decade, liquid crystals have been introduced into various technical areas where electro-optical and display device properties are required (for example in watch, calculator and typewriter displays). These display devices are based on the dielectric alignment effects in the nematic, cholesteric and/or smectic phases of the liquid-crystalline compounds, where, caused by the dielectric anisotropy, the molecular long axes of the compounds adopt a preferred alignment in an applied electric field. The conventional response times in these display devices are too long for many other potential areas of appliction of liquid crystals. This disadvantage is particularly noticeable if a large number of pixels have to be addressed. The production costs of equipment containing relatively large screen areas are then generally too high.

In addition to nematic and cholesteric liquid crystals, optically active smectic liquid-crystal phases have also been increasing in importance for a few years.

Clark and Lagerwall have been able to show that the use of ferroelectric liquid-crystal systems in very thin cells give electro-optical switch or display elements which have response times faster by a factor of up to 1000 compared with conventional TN ("twisted nematic") cells (cf., for example, Lagerwall et al., "Ferroelectric Liquid Crystals for Displays", SID Symposium, October Meeting 1985, San Diego, Calif., USA). Due to these and other favorable properties, for example the possibility for bistable switching and the contrast which is virtually independent of the viewing angle, FLCs are fundamentally very suitable for the abovementioned areas of application, for example via matrix addressing. Due to their high contrast and speed, ferroelectric liquid crystals are also particularly suitable in the area of spatial light modulators (cf., for example, U. Efron in "Spatial Light Modulators and Applications", SPIE, Vol. 1150, p. 46 ff).

However, for practical uses, a further improvement in the contrast of the ferroelectric liquid crystal device has been desired.

As one of the methods for improving the contrast of a ferroelectric liquid crystal device, a method of an electric field treatment which comprises applying a low frequency alternate current field has been proposed.

In a ferroelectric liquid crystal inserted between two substrates separated by a spacer of 1 to 2 $\mu$m, the layer is tilted from the normal direction of the substrate just after cooling from the isotropic phase and forms a chevron structure. For this reason, the angle $2\Theta_{eff}$ between two light-off positions shows a relatively low value.

By conducting the electric field treatment according to the above proposal, tilt of the layer to the normal direction of the substrate decreases, and the angle $2\Theta_{eff}$ between two light-off positions becomes large, thereby increasing the contrast. Also, by reducing the tilt of the layer, flickering of the molecule in the cone is reduced and, as a result, the contrast under the switching conditions is also improved.

However, in the device which has been subjected to the above-described electric field treatment, when used at a temperature higher than the temperature of the electric field treatment, there is a problem in that aberration occurs between the aligning direction of the liquid crystal molecule and the direction of the polarization axis thereby decreasing the contrast.

The decrease in the contrast which occurs at the temperature of the electric field treatment can be improved by conducting the electric field treatment at a maximum temperature in the temperature range where the device is used. (Refer to Kazuya Nagao, Japanese Journal of Applied Physics Vol. 30, No. 7A, July, 1991 ppL1189–L1191, and Preliminary Manuscripts Collections of the 17th Liquid Crystal Symposium, pp386–387.)

However, when the device which has been subjected to the electric field treatment at a high temperature is cooled to room temperature, the tilt angle $\Theta L$ of the ferroelectric liquid crystal layer toward the normal direction of the substrate increases again, and stripe-like defects which cause a decrease in contrast occur both in the memory state and in the switching state. Also, when $\Theta L$ is high, flickering of the molecule in the cone in the switching state becomes high and, as a result, a decrease in contrast occurs. This phenomenon is considered to occur for the following reasons.

The tilt angle $\Theta L$ of the ferroelectric liquid crystal layer toward the normal direction of the substrate is determined by an angle $2\Theta_{int}$ between two light-off positions measured under application of the electric field and an angle $2\Theta_{mem}$ between two light-off positions measured in the memory state, and is represented by the following equation:

$$\Theta L = \cos^{-1}(\cos \Theta_{int}/\cos \Theta_{mem}) \quad (1)$$

Generally, $\Theta L$ is smaller at a higher temperature and gradually increases as the temperature is reduced to a lower temperature side. Accordingly, when the electric field treatment is conducted at a high temperature, $\Theta L$ is approximately 0 degree at the temperature of the electric field treatment, but, when the temperature is reduced, $\Theta L$ increases, and a chevron structure is formed as shown in FIG. 1. Thus, in the region where layers having different bending directions of the chevron structure from each other are present adjacently as shown in FIG. 1a, stripe-like defects so-called "zigzag defects" occur and the contrast is decreased due to leakage of light from these defect portions.

[Problems to be Solved by the Invention]

From the reasons described above, the object of the present invention is to provide a ferroelectric liquid crystal mixture which is capable of preventing a decrease in contrast and maintaining good display properties, as well as a ferroelectric liquid crystal device using such a mixture.

[Means for Solving the Problems]

As a result of extensive studies for solving the above problems, the present inventors found that an excellent liquid crystal mixture can be prepared by taking temperature dependence of the cone angle into consideration, and completed the present invention.

More specifically, the present invention provides a liquid crystal mixture having a temperature range generating a chiral smectic C phase, characterized in that the difference between the cone angle at $(T_{C/A}-10)°$ C. and the cone angle at $(T_{C/A}-40)°$ C. in the temperature range generating the chiral smectic C phase is 10 degrees or below, wherein $T_{C/A}$ is referred to as the phase transition temperature from the chiral smectic C phase to the chiral smectic A phase. By using such a liquid crystal mixture, a ferroelectric liquid crystal device having a high contrast can be produced.

In another embodiment, the present invention provides a liquid crystal mixture having a temperature range generating a chiral smectic C phase, characterized in that the difference between the cone angle at $(T_{C/A}-20)°$ C. and the cone angle at $(T_{C/A}-40)°$ C. in the above-described temperature range is 5 degrees or below.

In still another embodiment, the present invention provides a liquid crystal mixture having a temperature range generating a chiral smectic C phase, characterized in that the difference between the cone angle at 45° C. and the cone angle at 25° C. in the above-described temperature range is 5 degrees or below.

The present invention also provides a liquid crystal display device comprising a pair of substrates having an electrode on at least one of the substrates and having a liquid crystal layer between the substrates, characterized in that the liquid crystal mixture used in the liquid crystal layer is the liquid crystal mixture described above.

Preferably, the liquid crystal display device according to the present invention has an alignment layer on at least one of the substrates.

Also, preferably, the liquid crystal display device according to the present invention has been subjected to an electric field treatment at room temperature or above. The electric field treatment can be conducted, for example, by applying a direct current or a low frequency alternate current of 100 Hz or below, and at a voltage of from 5V to 100V.

[EXAMPLES]

The present invention is further illustrated in more detail by the following examples. Example 1 illustrates an example with electric field treatment, and Example 2 illustrates an example without electric field treatment.

Example 1

A glass substrate having an ITO (indium tin oxide) layer was coated with a solution of POLIX-T008-A (a product of Hoechst) by spin-coating at 4,000 r.p.m. to form a thin layer having a thickness of about 10 nm. The substrate was heated at 160° C. for 30 minutes. After rubbing the coated layer with a nylon cloth in one direction, a cell was assembled from the resulting plates with a spacer having a thickness of 1.6 μm being inserted between the plates in such as manner that the rubbing directions were parallel to each other. By using the resulting test cell, characteristics of the liquid crystal mixture of the present invention were investigated.

The compounds shown below were mixed at the weight ratio (%) indicated below to prepare a liquid crystal mixture A.

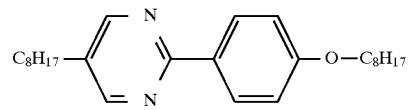

13

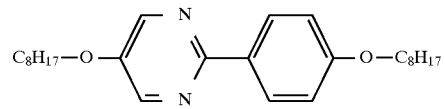

5

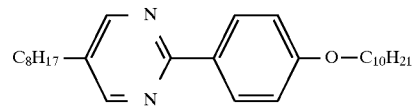

11

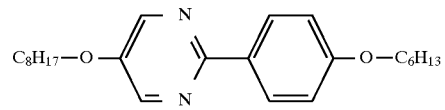

9

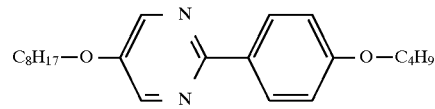

9

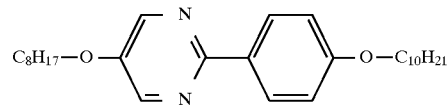

8

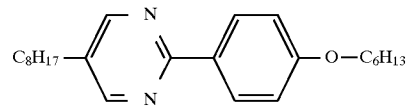

13

-continued

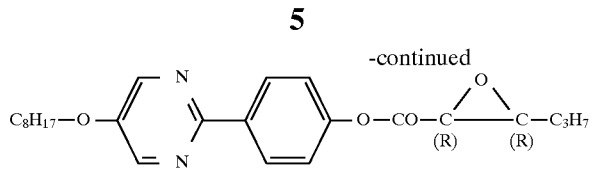 6

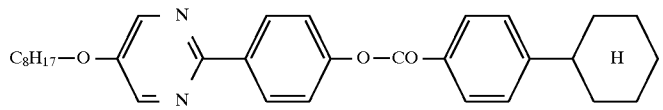 6

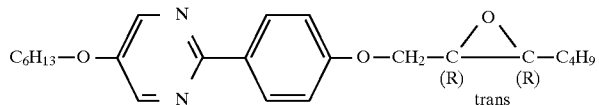 7

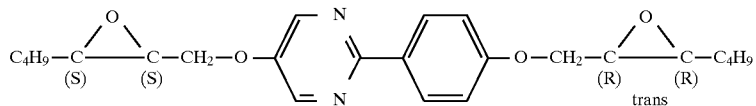 8

20

The compounds shown below were added to the liquid crystal mixture A at the weight ratio (%) indicated below to prepare a liquid crystal mixture B in accordance with the present invention.

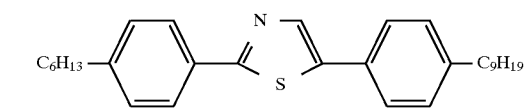 5

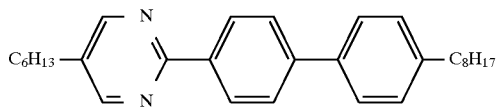 13

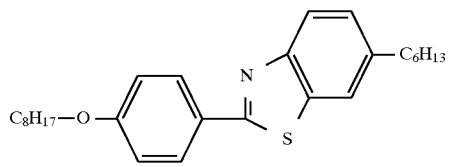 5

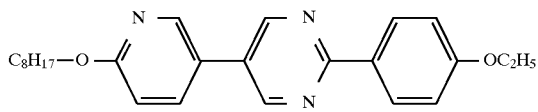 3

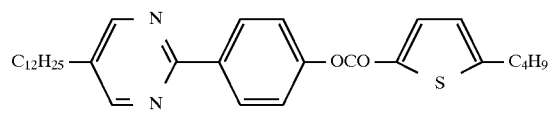 8

Also, the compound shown below was added to the liquid crystal mixture A in an amount of 8% by weight to prepare liquid crystal mixture C in accordance with the present invention.

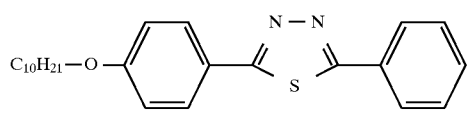

The phase transition temperatures of the liquid crystal mixtures A, B and C were as follows:

| A | Sc | 62 | Sa | 78 | N* | 85 | Iso |
|---|----|----|----|----|----|----|-----|
| B | Sc | 62 | Sa | 85 | N* | 92 | Iso |
| C | Sc | 61 | Sa | 86 | N* | 94 | Iso |

Then, each of the liquid crystal mixtures A, B and C was inserted into the above-described test cell in an isotropic phase and gradually cooled at a rate of 1° C./minute to a measurement temperature.

Then, a square pulse of 10 Hz, ±30V was applied to the cell and temperature characteristics of the cone angle ($2\Theta_{int}$) were measured. The measurement of the cone angle was conducted by rotating the cell, which was placed under an orthogonal cross-nicol, horizontally to a polarizing plate while applying a square pulse of 10 Hz, ±30V at a measurement temperature, detecting an optical response by a photodiode and measuring an angle of two light-off positions. The results obtained are shown in FIG. 2.

With respect to each of the mixtures, differences between the cone angle at 45° C. and the cone angle at 25° C. were as follows:

|  | $\Delta 2\Theta_{int}$ |
|---|---|
| Liquid Crystal Mixture A | 5.4 |
| Liquid Crystal Mixture B | 3.8 |
| Liquid Crystal Mixture C | 1.7 |

The test cell was subjected to an electric field treatment by applying a square pulse of 10 Hz, ±30V at 45° C. and, subsequently, the contrast in the memory state (contrast 1) and the contrast under a pulse drive shown in FIG. 3 (contrast 2) were measured at 25° C. Briefly, the liquid crystal device placed under an orthogonal cross-nicol was rotated horizontally to a polarizing plate and fixed at one of the light-off positions. A pulse of bias 4 and a pulse width of 50 μsec containing the data pulse as shown in FIG. 3 was applied to the liquid crystal device, and the ratio of the transmittance intensity of the light after applying a white writing pulse and the transmittance intensity of the light after applying a black writing pulse was referred to as a contrast. Also, the contrast was measured by applying a voltage which is capable of switching in the whole viewing area. The results obtained are shown below.

|  | Contrast 1 | Contrast 2 |
| --- | --- | --- |
| Liquid Crystal Mixture A | 71.4 | 9 |
| Liquid Crystal Mixture B | 125 | 20 |
| Liquid Crystal Mixture C | 143 | 40 |

As compared with the liquid crystal mixture A having a $\Delta 2\Theta_{int}$ of 5 or more, the contrast was improved in the liquid crystal mixture B in the memory state and in the drive state.

Also, in liquid crystal mixture C having a $\Delta 2\Theta_{int}$ lower than that of liquid crystal mixture B, the contrast was markedly improved in either the memory state and the drive state.

Accordingly, it is apparent that ferroelectric liquid crystal display devices can be obtained by using a liquid crystal mixture having a low value of $\Delta 2\Theta_{int}$ according to the present invention.

Example 2

Each of the liquid crystal mixtures A, B and C described in Example 1 was injected into the test cell described in Example 1 in an isotropic phase, and cooled gradually at a rate of 1° C./minute to the measurement temperature. The pulse described above was applied to the resulting cell and switched to either one of light-off positions, and switching was stopped at that position. The liquid crystal device placed under an orthogonal cross-nicol was rotated horizontally to a polarizing plate at 25° C., and fixed at the position where the light transmittance became minimum in the photodiode. At this position, a percent light transmittance at the light-off position, when the light transmittance at the position where the two polarizing plates and the molecule are parallel to each other was referred to as 100%, was measured as transmittance in a dark state. Then, while fixing the position of this cell, transmittance at 45° C. was measured. The results obtained are as follows:

|  | 25° C. | 45° C. |
| --- | --- | --- |
| Liquid Crystal Mixture A | 0.5 | 1.6 |
| Liquid Crystal Mixture B | 0.5 | 1.2 |
| Liquid Crystal Mixture C | 0.5 | 1.0 |

The above example indicates that, in the actual display, when the polarizing plate is fixed at room temperature, the light transmittance increases at a different temperature. In the above example, the light transmittance at 45° C. decreases in the order of the liquid crystal mixtures A, B and C. In particular, by using the liquid crystal mixture B or C having a low temperature dependency of $\Delta 2\Theta_{int}$, an effect for inhibiting the decrease in the contrast value by temperature changes can be obtained.

BRIEF DESCRIPTION OF THE DRAWINGS

FIG. 1 is a schematic drawing showing a layer tilt angle $\Theta_L$ and a cross-sectional structure of the layer.

FIG. 2 is a graph showing temperature characteristics of the cone angle.

Figure 3A:
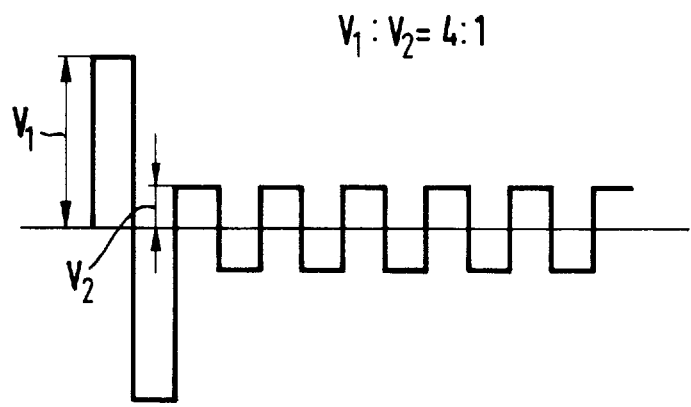
FIG. 3 is a waveform of the applied pulse drive.
Figure 3B:
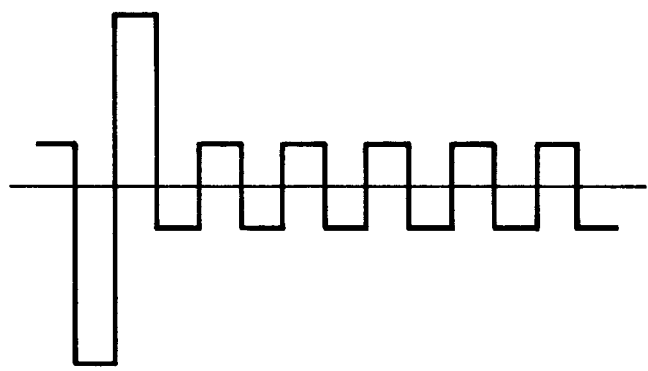

We claim:

1. A liquid crystal mixture having a temperature range generating a chiral smectic C phase and a temperature range generating a smectic A phase, and having a difference between the cone angle at $(T_{C/A}-10)°$ C. and the cone angle at $(T_{C/A}-40)°$ C. in said temperature range generating the chiral smectic C phase of from zero (0) degrees to ten (10) degrees.

2. The liquid crystal mixture as claimed in claim 1, having a temperature range generating a chiral smectic C phase and a temperature range generating a smectic A phase, and having a difference between the cone angle at $(T_{C/A}-20)°$ C. and the cone angle at $(T_{C/A}-40)°$ C. in said temperature range generating the chiral smectic C phase of from zero (0) degree to five (5) degrees.

3. The liquid crystal mixture as claimed in claim 1 having a temperature range generating a chiral smectic C phase and a temperature range generating the smectic A phase, and having a difference between the cone angle at 45° C. and the cone angle at 25° C. in said temperature range generating the chiral smectic C phase of from zero (0) degree to five (5) degrees.

4. A liquid crystal display device comprising a pair of substrates having an electrode on at least one of the substrates and having a liquid crystal layer between said substrates, wherein the liquid crystal mixture used in said liquid crystal layer is a liquid crystal mixture as claimed in claim 1.

5. The liquid crystal display device as claimed in claim 4, comprising a pair of substrates, in which a transparent electrode and an alignment layer are formed in order on the inside surfaces of said substrates, which has been subjected to an electric field treatment at room temperature or above.

* * * * *